2 Sheets--Sheet 1.

R. THOMPSON.
Machines for Making Cutters for Grooving Needles.

No. 155,173. Patented Sept. 22, 1874.

Witnesses:
R. L. Barten
M. P. Goodwin

Inventor:
Roswell Thompson

2 Sheets--Sheet 2.
R. THOMPSON.
Machines for Making Cutters for Grooving Needles.
No. 155,173. Patented Sept. 22, 1874.
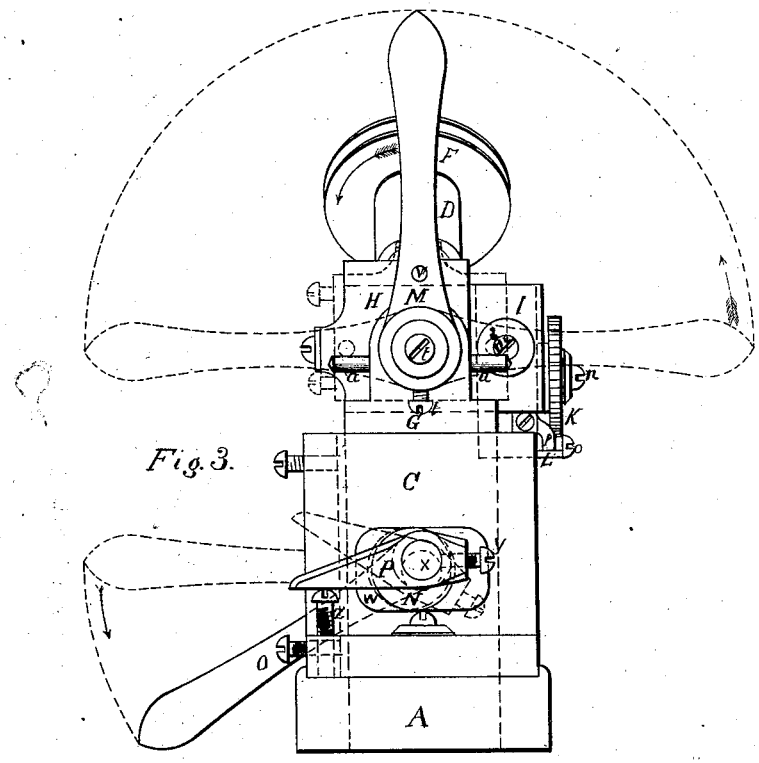
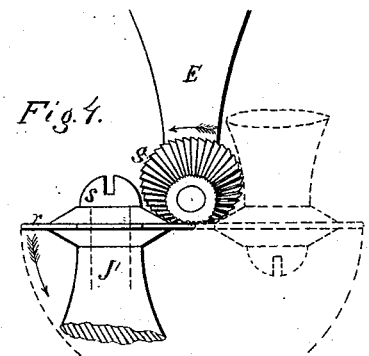
Witnesses:
R S Barton
M. F. Goodwin
Inventor;
Roswell Thompson

UNITED STATES PATENT OFFICE.

ROSEWELL THOMPSON, OF BRIDGEPORT, CONNECTICUT.

IMPROVEMENT IN MACHINES FOR MAKING CUTTERS FOR GROOVING NEEDLES.

Specification forming part of Letters Patent No. 155,173, dated September 22, 1874; application filed August 13, 1874.

*To all whom it may concern:*

Be it known that I, ROSEWELL THOMPSON, of Bridgeport, in the county of Fairfield and State of Connecticut, have invented a new and Improved Machine for Making Needle-Grooving Cutters, of which the following is a specification:

The object of my invention is to form the teeth of cutters used for grooving sewing-machine needles in such a manner that they may be perfectly semicircular in shape, uniform in size, and of equal distance from the center of the blank; and I do hereby declare the following to be a full, clear, and exact description of the construction and operation of the same, reference being had to the accompanying drawings making a part of this specification.

Similar letters of reference indicate corresponding parts.

Figure 1:
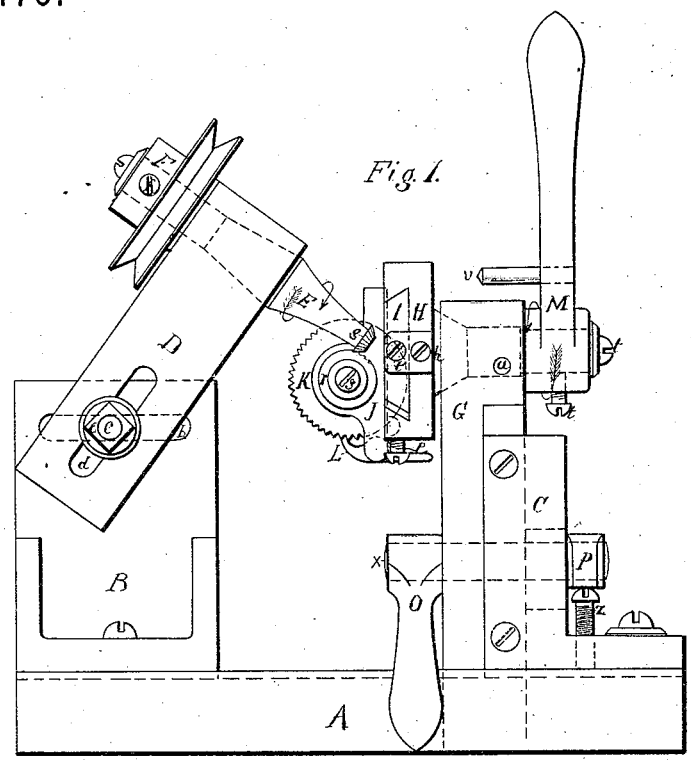
Figure 2:
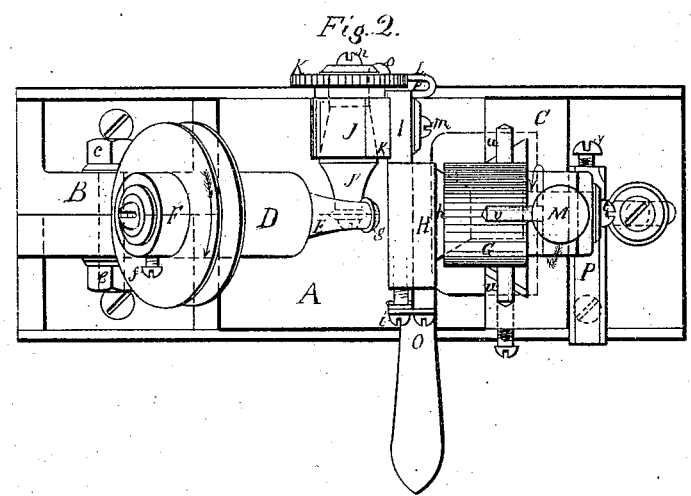

Figure 1 is a front elevation of my improved machine. Fig. 2 is a plan of the same. Fig. 3 is a right-end elevation, and Fig. 4 is an enlarged view, of the milling cutter and blank, showing the relative positions of the same in the operation of milling a tooth.

To enable others skilled in the art to make and use my invention, I will proceed to describe the same with reference to the accompanying drawings.

A is the bed of the machine, constructed with a wide groove on the top side nearly the width of the bed, as shown in the end elevation, Fig. 3, and plan, Fig. 2. B and C are uprights fitted to the groove in A, but so as to slide freely in the same, that they may be easily moved and adjusted to any desired position on the bed A. D is an adjustable bearing to receive the milling-cutter spindle E. A slot, $d$, is made through the adjustable bearing D, and also a similar slot, $b$, is made through the upright B. A bolt, $c$, is passed through the slots $d$ and $b$, and a nut $e$ is screwed on the end of the bolt $c$. The bearing D can thus be adjusted and firmly secured to any required angle with respect to the upright B. F is the pulley for driving the milling cutter-spindle E, and is secured to the same by means of the set-screw $f$. $g$ is the milling-cutter, which is made with a beveled edge, and with a screw-thread cut through the center similar to a nut and screwed on the small end of the spindle E. G is an upright bearing to receive the revolving stud $h$, and fitted to slide freely in the vertical beveled groove in the upright C. H is a bearing secured rigidly to the revolving stud $h$. I is a sliding bar fitted to slide freely in the beveled groove in H, and is adjusted and secured to any required position in the groove in the bearing H by means of the set-screw $i$. J is a bearing to receive the blank-cutter arbor J', and is secured in the shallow groove $k$, near the end of the sliding bar I, by means of the screw $m$. K is the index, which is cut on the surface with the number of teeth required to be milled in the blank-grooving cutter, and is secured to the end of the blank-cutter arbor by means of a key which fits in a slot cut in the center hole of the index, and a screw, $n$, with a washer under the head, screwed into the end of the arbor J'. L is a pawl secured to the blank-cutter arbor-bearing by means of the stud $o$, and swinging freely upon the same. The end of the pawl L is formed to fit between the teeth of the index K, and is pressed and held in position by means of the spring $p$, which presses upon the opposite end of the pawl. $r$ is the blank-cutter, secured on the end of the arbor J' by means of the screw $s$. There is a shoulder turned on the end of the arbor J' corresponding in size to the hole in the center of the blank $r$. The blank to be milled is thus secured perfectly concentric with the arbor J'. M is a handle secured rigidly to the revolving stud $h$ by means of the screws $t$ $t$. $u$ $u$ are pins driven into the sides of the upright bearing G. $v$ is a pin driven into the side of the handle M, and is designed to strike against the pins $u$ $u$ to limit the motion of the handle M as it is oscillated in either direction. N, Fig. 3, is a cam to regulate the motion of the upright bearing G and connected parts. The cam N is fitted to the slot $w$ in the upright C, and allowed to move freely in the same. It is secured rigidly to a shaft, $x$, by means of a pin passing through both. The shaft $x$ passes through a hole in the upright bearing G. O is a handle secured to the shaft $x$ by means of a set-screw or pin. P is a lever secured to the opposite end of the shaft $x$, and is adjustable to any required position, and then held by means of the set-screw $y$. $z$ is a set-screw to regulate and limit the motion of the upright bearing G and other parts connected therewith.

I will now proceed to describe the practical operation of my improved machine with reference to the accompanying drawings.

The driving-pulley F, spindle E, and milling-cutter $g$ are understood to revolve in the direction indicated by the arrows drawn upon the same. The handle O is held in about the position shown in broken outline, Fig. 3. A blank of suitable thickness and diameter is now secured to the end of the arbor J' in the manner clearly shown in the enlarged drawing of the same, Fig. 4. The handle M is then placed in the position of the broken outline of the same shown to the right of the drawing, Fig. 3, and with the pin $v$ resting upon the pin $u$ in the upright bearing G. The handle O is now pressed down in the direction indicated by the arrow until the lever P rests upon the head of the screw $z$. The blank $r$ is now in a position to be milled by the milling-cutter $g$ upon the top side of the same. The handle M is now moved forward or raised in the direction indicated by the arrow until the pin $v$ strikes the pin $u$, which is driven into the opposite side of the upright bearing G. thus describing a perfect semicircle with the handle M and connected parts, and cutting a perfect semicircular tooth upon the edge of the blank $r$ by commencing upon one side of the blank and finishing upon the opposite side of the same, as shown in broken lines, Fig. 4, the machine being previously adjusted in such a manner that the center of motion of the blank to be milled shall be at the point on the edge of the blank where the tooth is to be cut. Thus any size circle of tooth required can be easily and perfectly made.

Grooving-cutters made in this manner are much more effective and durable than those filed by hand or cut with a cold-chisel, as all the teeth are uniform in length, shape, and size.

Having thus described my invention, I claim as new and desire to secure by Letters Patent—

1. The combination of the upright B, the swinging (vertically and horizontally) adjustable bearing D, pulley F, milling-cutter spindle E, and cutter-blank arbor J', substantially as described.

2. The combination of the cutter-blank arbor J', adjustable sliding bar I, bearing H, sliding bearing G, spindle $h$, oscillating lever M, and stop-pins $v$ $u$ $u$, substantially as specified.

3. The combination of the sliding bearing G with blank-holding arbor J', shaft $x$, cam N, lever P, stop-screw $z$, and lever-handle O, substantially as and for the purpose specified.

ROSEWELL THOMPSON.

Witnesses:
R. S. BURTON,
FAUSTINA GOODWIN.